US006460423B1

(12) United States Patent
Keller et al.

(10) Patent No.: US 6,460,423 B1
(45) Date of Patent: Oct. 8, 2002

(54) METHOD OF MEASURING PRELOAD IN A MULTIROW BEARING ASSEMBLY

(75) Inventors: Larry L. Keller, Canal Fulton, OH (US); William E. Harbottle, Fort Lauderdale, FL (US); Rahil Hasan, Broadview Heights, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/775,168

(22) Filed: Feb. 1, 2001

(51) Int. Cl.[7] .............................. G01L 5/12; G01L 1/26
(52) U.S. Cl. ............................ 73/862.49; 73/862.392
(58) Field of Search .................. 73/862.451, 862.46, 73/862.471, 862.392, 862.49

(56) References Cited

U.S. PATENT DOCUMENTS

| | | | | |
|---|---|---|---|---|
| 4,033,644 A | * | 7/1977 | Reneerkens | 267/161 |
| 4,054,999 A | * | 10/1977 | Harbottle | 29/407.06 |
| 5,433,536 A | * | 7/1995 | Bergling | 384/563 |
| 5,597,965 A | | 1/1997 | Endo et al. | |
| 5,763,772 A | | 6/1998 | Bywalez et al. | |
| 5,877,433 A | * | 3/1999 | Matsuzaki | 73/862.01 |

FOREIGN PATENT DOCUMENTS

WO 9858762 12/1998

OTHER PUBLICATIONS

L. L. Keller; Design News "Computerized Bearing Measurements Optimize Machine Output", Jun. 4, 1984; pp. 89–91.

* cited by examiner

Primary Examiner—Max Noori
(74) Attorney, Agent, or Firm—Polster, Lieder, Woodruff & Lucchesi, L.C.

(57) ABSTRACT

The preload in a double row production bearing assembly is ascertained by comparing the deflection produced in that bearing assembly by oppositely directed thrust forces with the deflection produced in a master bearing assembly by equivalent thrust forces likewise applied in opposite directions. The master bearing assembly is similar in configuration and substantially equal in stiffness to the production bearing assembly, but exists in a state of end play. Each thrust force is transferred through the rolling elements of one row and should be sufficient in magnitude to unseat the rolling elements of the other row. The preload in the production bearing assembly equals the end play in the master bearing assembly plus the deflection in the production assembly less the deflection in the master assembly. The endplay in the master bearing assembly is ascertained by extrapolating the deflection to zero thrust force.

30 Claims, 6 Drawing Sheets

METHOD OF MEASURING PRELOAD IN A MULTIROW BEARING ASSEMBLY

BACKGROUND OF THE INVENTION

This invention relates in general to antifriction bearings and, more particularly, to a method of measuring preload in a multirow bearing assembly.

In its most basic form a two row bearing assembly has an inner component and an outer component, one of which rotates relative to the other about an axis of rotation, and in addition, rolling elements arranged in two rows between the inner and outer components. The rolling elements roll along raceways on the inner and outer components, and while all of the raceways are inclined, the raceways for the one row are inclined in a direction opposite the raceways for the other row. This enables the bearing assembly to transfer thrust loads in both axial directions. Furthermore, when one of the raceways in the bearing assembly is capable of being adjusted axially, the setting for the bearing assembly may be adjusted to one of end play or preload, depending on the position of the adjusted raceway. When end play exists, the bearing assembly possesses a limited amount of axial and radial clearance between the inner and outer components, whereas in preload no clearance exists, and the rolling elements are continuously loaded.

The wheels on automotive vehicles to a large extent revolve on two row bearing assemblies, and this holds particularly true as to those wheels that are independently suspended. Two row bearing assemblies are traditionally supplied to automotive companies set to a condition of end play, but with the capacity to be adjusted. The automotive companies make the final adjustments, and often this is one of slight preload, particularly where the two rows of rolling elements are close together. However, some bearing assemblies are now being supplied fully unitized and preset. That type of bearing assembly contains at least one initially separate race, and that race is initially configured to impart end play to the bearing assembly. Using measurements taken from the bearing assembly after it is partially assembled and from the initially separate race, the end front face of that initially separate race is ground down to provide the bearing assembly with the desired amount of preload once the race is installed in the assembly. Thereafter, the assembly is unitized to permanently capture the initially separate race and the two rows of rolling elements within the assembly. After the bearing assembly is unitized, the preload should be checked to insure that it falls within acceptable tolerances. After all, too much preload will cause early failure of the bearing assembly and retard rotation. On the other hand, excessive end play will concentrate the radial load at only a few rollers and may produce wheel shake or reduce bearing life.

To be sure, procedures exist for at least estimating preload in unitized two row bearing assemblies. Perhaps the easiest amounts to nothing more than measuring the torque in the bearing assembly, that is, the resistance to rotation that resides in the bearing assembly itself. But torque provides only an approximation of preload and is distorted by lubrication and by seals which are also captured in such bearing assemblies. A more sophisticated procedure involves subjecting the bearing assembly to thrust loads in both axial directions and plotting those loads against deflection. From the plot one can determine preload. See Keller, Computerized Bearing Measurements Optimize Machine Output, Design News, Jun. 4, 1984. This procedure consumes considerable time, and while it works quite satisfactory in a laboratory environment, it is not suitable for use in a production line.

SUMMARY OF THE INVENTION

The present invention resides in a method of ascertaining preload in a first bearing assembly having multiple rows of rolling elements organized to transfer thrust loads in both axial directions. The method requires comparing the deflection characteristics of the first bearing assembly with the deflection characteristics of a second bearing assembly set to a condition of end play. The invention also resides in a method of ascertaining the amount of end play in the second bearing.

DESCRIPTION OF THE DRAWINGS

FIG. 4 A,B,C are graphs showing forces plotted against deflections for different settings of the master bearing assembly.

DETAILED DESCRIPTION

Referring now to the drawings, a production bearing assembly A (FIG. 1), which accommodates rotation about an axis X, is furnished in a preset and unitized condition, its setting having been verified in the procedure described and illustrated. That procedure is undertaken after the bearing assembly A is assembled and of course set, and while the procedure has its greatest utility verifying permanently unitized bearing assemblies, it also has utility verifying the settings of bearing assemblies that are not permanently unitized, but instead are held together with other means such as nuts. The bearing assembly A is designed to couple the road wheel of an automotive vehicle to the suspension system of such a vehicle, but the procedure may be used to verify the settings of antifriction bearings used for other applications as well, such as the bearings used to support machine tool spindles and the bearings used for pinion shafts in the differential housings of automotive vehicles.

Considering the production bearing assembly A first, it includes (FIG. 1) a housing 2, a hub 4, a cone 6 and rolling elements in the form of tapered rollers 8, which are located within the housing 2 and around the hub 4 and cone 6 to facilitate rotation of the hub 4 and cone 6 about the axis X with minimal friction. The housing 2 constitutes an outer bearing component, while the hub 4 and cone 6 together form an inner bearing component. The rollers 8 are positioned between the housing 2 and the hub 4 and the cone 6 in two rows of differing orientation, so that the rollers 8 confine the hub 4 and cone 6 axially in the housing 2, but do not offer any significant impediment to rotation. In addition, the bearing assembly A has cages 10 for separating the rollers 8 of the two rows. Finally, the assembly A has a seal 12 at the outboard end of the housing 2 and another seal 14 at the inboard end, each to retain a lubricant in and to exclude contaminants from the interior of the housing 2 and the rollers 8 in that interior. When the assembly A is installed on an automotive vehicle, the housing 2 is bolted to a suspension system component, such as a steering knuckle, while a brake disk and road wheel are attached to the hub 4. Thus, the bearing assembly A couples the road wheel to the suspension system component.

The housing 2 is formed from a bearing-grade steel having enough carbon to accept case hardening by induction heating. It has (FIG. 1) tapered raceways 16 and 18 which are presented inwardly toward the axis X and a generally triangular or rectangular flange 20 which projects outwardly away from the axis X. The two raceways 16 and 18 taper downwardly toward an intervening surface 22 which separates them. The raceway 16 opens out of the outboard end of the housing 2, and here the housing 2 has a seal mounting surface 24. The other raceway 18 opens into an end bore 26 which in turn opens out of the inboard end of the housing 2. The flange 20 has an end face 28, which is machined perpendicular to the axis X, and threaded holes 30 which receive bolts for securing the housing 2 to a suspension system component with its end face 28 against the component.

Figure 1:
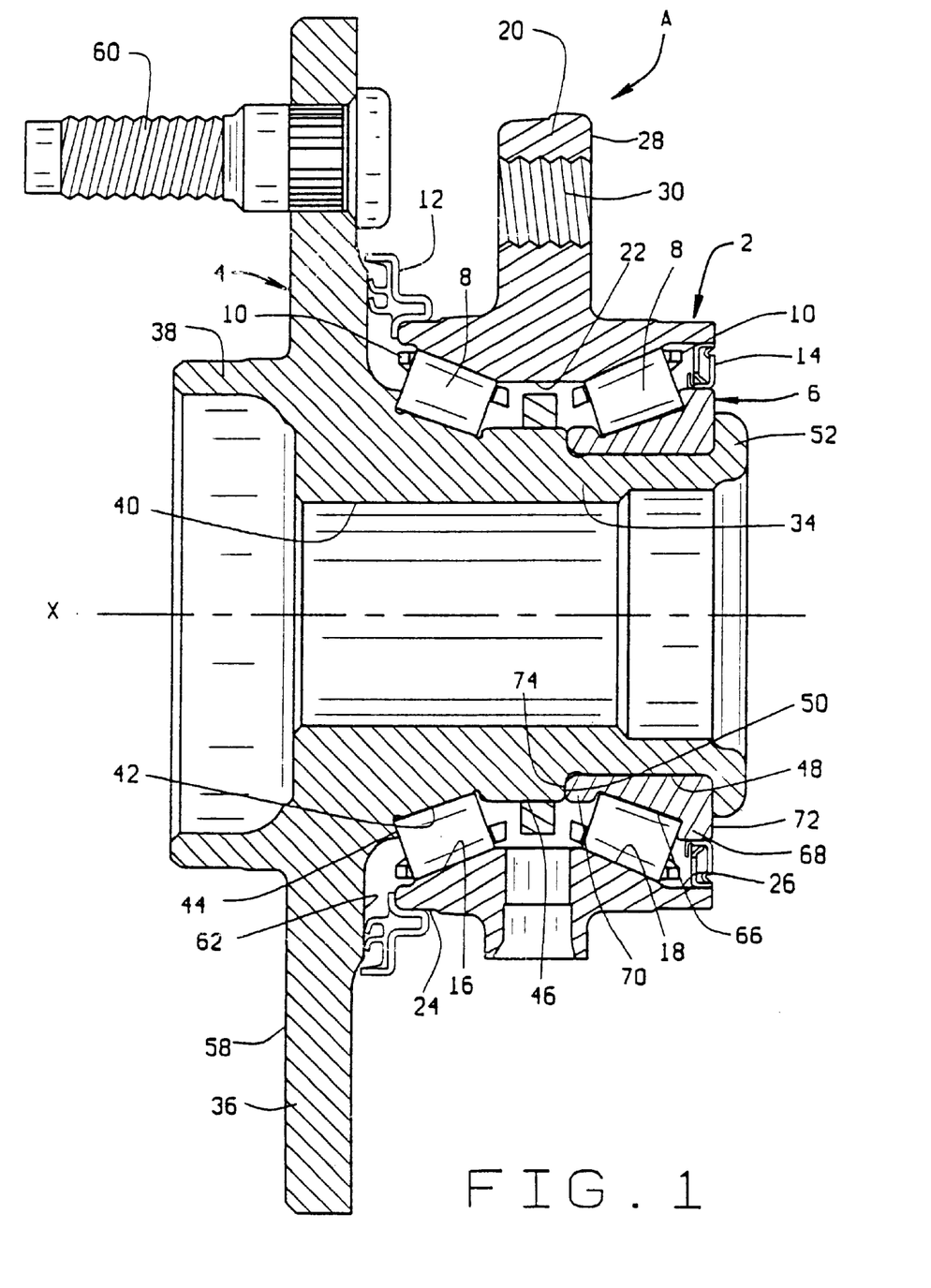
FIG. 1 is a longitudinal sectional view of a production bearing assembly, the preload of which is measured in accordance with the present invention.

The housing 2 is formed by a forging or casting and is thereafter machined along the raceways 16 and 18 and also along the seal mounting surface 24, the end bore 26, and the end face 28. The holes 30 are also bored and tapped. Then the housing 2 is induction heated along its raceways 16 and 18 and quenched to case harden the steel in those regions. Finally, it is ground along the raceways 16 and 18.

The hub 4 is likewise formed from a bearing grade steel which is capable of being case hardened by induction heating. It includes (FIG. 1) a spindle 34 which projects axially through the housing 2, its center being the axis X, and a mounting flange 36 which lies beyond the outboard end of the housing 2. In addition, the hub 4 has a wheel pilot 38 in the form of a circular rib which projects axially from the flange 36 and away from the spindle 34 and is machined on its outside surface and on its end face, the latter so as to lie in a plane perpendicular to the axis X. The hub 4 contains a bore 40 which extends completely through the spindle 34, opening at its outboard end into the wheel pilot 38. The bore 40 may include a spline for engaging the spline on a stub axle forming part of a constant velocity (CV)joint.

The spindle 34 has an outboard raceway 42 which is presented outwardly toward the outboard raceway 16 of the housing 2 and slopes in the same direction. The raceway 42 lies between a thrust rib 44 that is offset slightly from the mounting flange 36 and a retaining rib 46 of extended length, the large end of the raceway 42 being at the thrust rib 44 and the small end at the retaining rib 46. The intervening surface 22 of the housing 2 surrounds the retaining rib 46 and beyond the rib 46, the spindle 34 has a cone seat 48 of lesser diameter. The rib 46 and cone seat 48 meet at a shoulder 50. At the other end of the seat 48, the spindle 34 turns outwardly in the provision of a formed end 52.

The mounting flange 36 around the pilot 38 has a machined surface 58 and lug bolts 60 which project beyond the machined surface 58. They pass through a brake disk and a wheel rim, both of which are secured to the flange 36 with lug nuts which thread over the bolts 60. On its opposite face the mounting flange 36 has a machined sealing surface 62 which is presented toward the outboard end of the housing 2.

The hub 4 is formed with the inboard end of its spindle 34 extended at essentially the same diameter as the cone seat 48. In this condition the hub 4 is machined along the raceway 42, thrust rib 44, cone seat 48, shoulder 50, and surfaces 58 and 62. Then it is induction heated along its raceway 42 and thrust rib 44 and quenched to provide the raceway 42 and rib with a hard case. Thereafter, it is ground along its raceway 42 and rib 44.

The cone 6 is preferably formed from a bearing-grade steel which heat treated to the necessary hardness. The cone 6 fits over the cone seat 48 on the spindle 34 of the hub 4 with an interference fit, and lies captured between the shoulder 50 and the formed end 52. It has (FIG. 1) a tapered raceway 66 that is presented outwardly toward the inboard raceway 18 of the hub 2 and slopes in the same direction, a thrust rib 68 at the large end of the raceway 66, and a retaining rib 70 at the small end. The thrust rib 68 runs out to a back face 72, whereas the retaining rib 70 ends at a front face 74, both of which are squared off with respect to the axis X. The front face 74 bears against the shoulder 50 on the hub spindle 34, whereas the formed end 52 bears against the back face 72.

The tapered rollers 8, which are likewise formed from bearing grade steel, lie in two rows within the confines of the housing 2, there being an outboard row between the outboard raceway 16 of the housing 2 and the outboard raceway 42 on the spindle 34 of the hub 4 and an inboard row between the inboard raceway 18 of the housing 2 and the raceway 66 of the cone 6. Contact exists between the tapered side surfaces of the rollers 8 in the outboard row and the raceways 16 and 18. The large end faces of these rollers 8 bear against the face of the thrust rib 44 which keeps the rollers 8 of the outboard row from being expelled from the interior of the housing 2. Likewise, contact exists between the tapered side faces of the rollers 8 of the inboard row and the raceways 18 and 66. The large end faces of the rollers 8 of the inboard row bear against the thrust rib 68 of the cone 6 which keeps those rollers 8 from being expelled. The rollers 8 of each row are on apex, meaning that the conical envelopes for the rollers 8 of the row, will have their apices at a common point along the axis X. The spacing between the raceway 42 on the spindle 34 and the raceway 66 on the cone 6 determines the setting of the bearing assembly A, and that is usually one of preload up to a few thousandths of an inch. As a consequence, no radial or axial free motion exists between the housing 2 and the hub 4.

The outboard seal 12 fits over the mounting surface 24 on the exterior of the housing 2 and establishes a dynamic barrier along the sealing surface 62 on the mounting flange 36 of the hub 4. The inboard seal 14 fits into the end bore 26 of the housing 2 and around the thrust rib 68 of the cone 6 where it establishes another dynamic barrier.

To assemble the bearing assembly A, one first installs the outboard row of rollers 8 and its cage 10 around the outboard raceway 42 of the spindle 34 on the hub 4. The housing 2, with the outboard seal 12 installed on its mounting surface 24, is advanced over the spindle 34 until its outboard raceway 16 seats against tapered side faces of the rollers 8 of the outboard row. Initially, the cone seat 48 of the hub spindle 34 extends out to the very end of the spindle 34, it being somewhat longer than its final length in order to provide enough metal to produce the formed end 52. The cone 6 is forced over the cone seat 48 until the rollers 8 of the two rows seat firmly against their raceways 16, 42, and 18, 66. Then the portion of the hub spindle 34 which projects axially beyond the back face 72 of the cone 6 is deformed in a rotary forming procedure to create the formed end 52.

The rotary forming procedure holds the front face 74 of the cone 6 tightly against the shoulder 50 of the spindle 34 so that the cone 6 is captured between the shoulder 50 and the formed end 52. This not only brings the assembly A to its final setting, but further permanently unitizes the bearing assembly A. International patent application PCT/GB98/01823, which was published under number WO98/58762, discloses a suitable rotary forming procedure.

The bearing assembly A may be unitized by other means as well. For example, a nut threaded over the end of the spindle 34 and against the back face 72 of the cone 6 will serve to unitize the assembly. Also the raceway 42 need not be formed directly on the spindle 34 of the hub 4, but instead may be on another cone. Moreover, the raceways 16 and 18 need not be formed directly on the housing 2, but may on separate races, called cups, that are pressed into the housing 2.

Theoretically, the bearing assembly A, once it is assembled, should have the correct preload. However, tolerances may build up and errors may occur in the assembly. These will affect the actual setting of the bearing A, perhaps giving it a preload outside of acceptable limits. Hence, the desirability of measuring preload once the bearing assembly A is unitized.

In order to verify that the preload within the bearing assembly A exists within acceptable limits and, indeed, to ascertain the dimensional magnitude of that preload, one turns to a master bearing assembly B which in many respects is the same as the bearing assembly A. To this end, the master bearing assembly B preferably has essentially the same configuration as the bearing assembly A, both externally and internally, and certainly has the same axial and radial stiffness. Thus, each will undergo the same amount of elastic deformation when subjected to equivalent loads, particularly thrust loads. However, the master bearing assembly B is set to a condition of end play.

Figure 2:
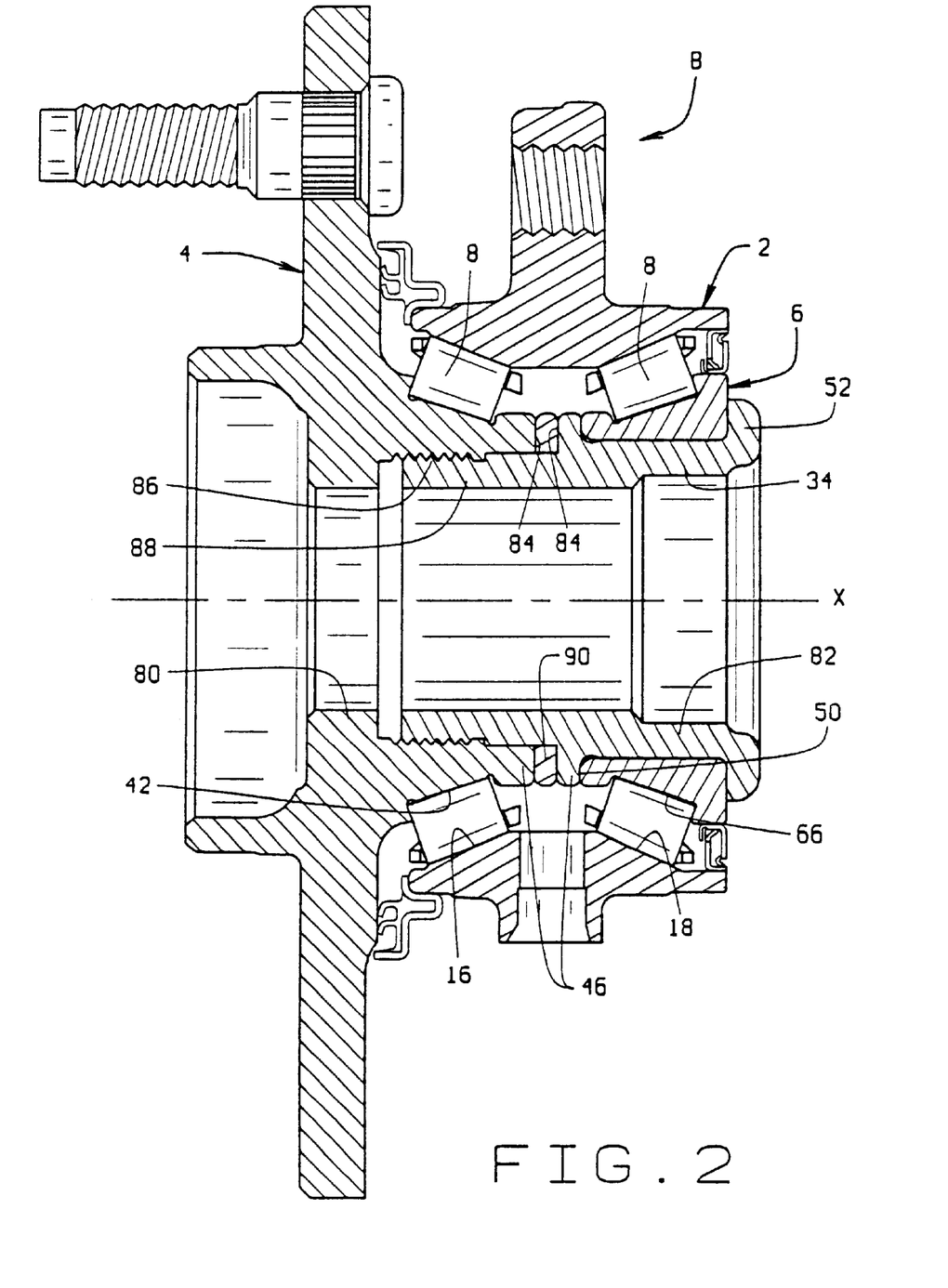
FIG. 2 is a longitudinal sectional view of a master bearing assembly, set to a condition of end play, for establishing deflection characteristics from which the preload in the production bearing assembly may be ascertained.

One of the production bearing assemblies A may serve as the master bearing assembly B, assuming that it is assembled with end play, but more conclusive results are achieved when the master bearing assembly B, notwithstanding its formed end 52, may be disassembled to change its setting (FIG. 2). To achieve this end, the spindle 34 of the hub 4 is segmented into an outboard section 80 and an inboard section 82. The outboard section 80 carries the outboard raceway 42 and the thrust rib 44. The inboard section 82 has the shoulder 50, the cone seat 48, and the formed end 52 and also has the cone 6 captured on it. The retaining rib 46 is split, one half of it being on the outboard section 80 and the other half on the inboard section 82. Each half of the segmented rib 46 ends at a shoulder 84, and the two shoulders 84 are presented toward each other between the two rows of rollers 8. The outboard section 80 contains a counterbore 86 which is threaded at its end and receives an extension 88 that projects axially from the shoulder 84 on inboard section 82. At its end the extension 88 has threads which engage the threads at the end of the counterbore 86, so that the engaged threads hold the two sections 80 and 82 together. While the shoulders 84 on the two segments of the split retaining rib 46 are presented toward each other, they do not contact each other. Instead, they bear against a spacer 90 which separates them.

The spacer 90 is formed from the same bearing steel as the hub 4 or at least it should have the same modulus of elasticity that the steel of the hub 4 has at its retaining rib 46. The spacer 90 of course determines the spacing between the outboard raceway 42 and on the hub 4 and the inboard raceway 66 on the cone 6, and that determines the setting for the master bearing assembly B. Actually, a set of spacers 90 exists, with each of a known thickness. Some of the spacers 90 are thick enough to create end play in the bearing assembly B, while others are thin enough to create preload. The spacers 90 may be changed simply by rotating the inboard section 82 relative to the outboard section 80 until the threads disengage, and then withdrawing the extension 88 of the inboard section 82 from the counterbore 86 of outboard section 80. When the inboard section 82 is detached from the outboard section 80, the spacer 90 that is around the extension 88 on the inboard section 82 may be removed and replaced with a different spacer 90. The inboard section 82 is again installed on the outboard section 80. With the threads on the two sections 80 and 82 engaged, the inboard section 82 is turned until a prescribed torque is achieved, that torque being sufficient to clamp the spacer 90 tightly between the two shoulders 84.

Figure 3A:
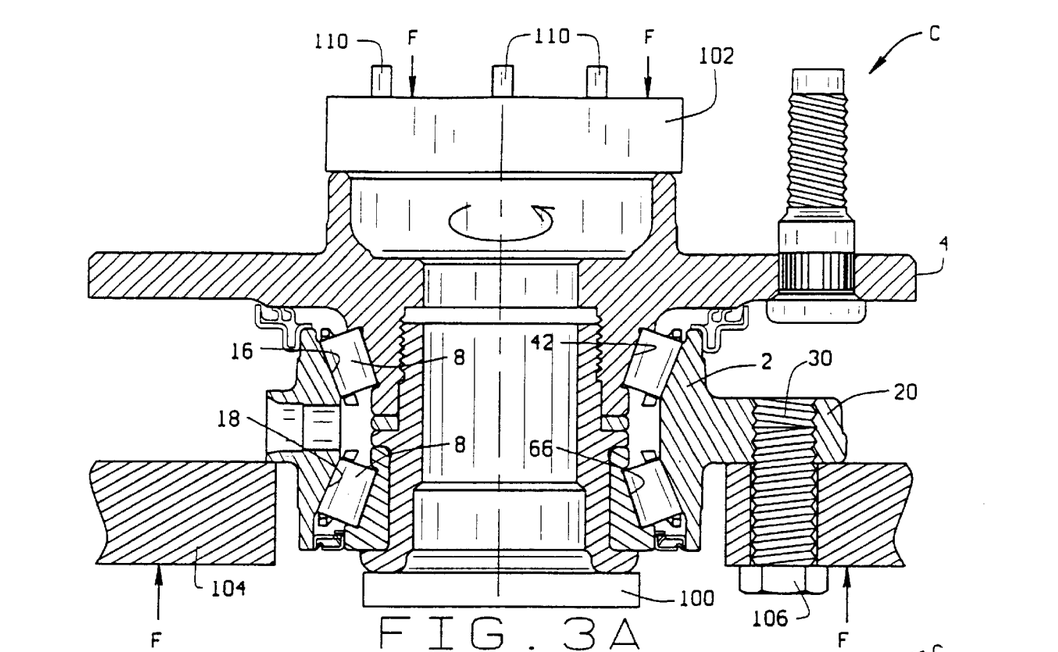
FIGS. 3A,B are sectional views, partially schematic, showing thrust forces applied to the master bearing assembly to determine deflection characteristics of that bearing assembly.
Figure 3B:
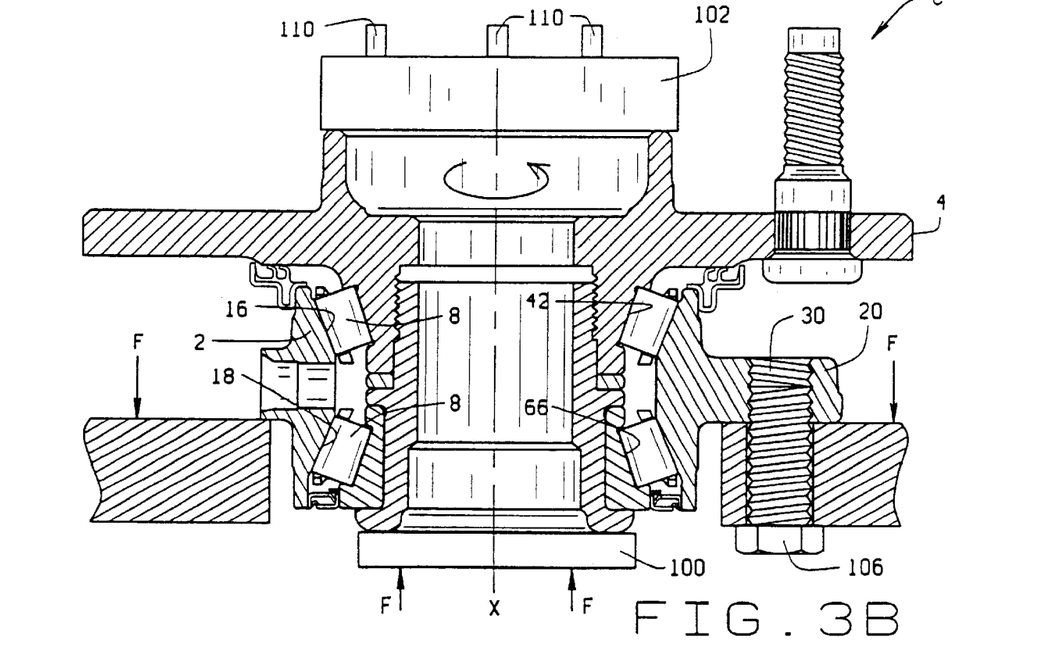

Once the master bearing assembly B is assembled with a selected spacer 90 that places the assembly B in end play, the axial deflection characteristics of the assembly B, that is the movement of the housing 2 and the hub 4 relative to one another under varying axial loads, are ascertained. To this end, the bearing assembly B is placed in a gauging device C (FIG. 3 A,B) which subjects the assembly B to varying forces in both axial directions while the deflections produced by those forces are measured. Actually, part of any deflection resides in the gauging device C itself. But the deflection in the device C is a constant for any given force when either the bearing assembly A or the bearing assembly B is measured on the device C. So the term "deflection of the bearing assembly" and similar expressions includes the deflection of the gauging device C.

The gauging device C includes a push member 100 that bears against a surface at one end of the hub 4, preferably on the formed end 52, and another push member 102 which bears against a surface at the other end of the hub 4 and that surface may be the end of the wheel pilot 38. In any event, the member 102 always remains against the hub 4 so that it reflects the axial position of the hub 4. In addition, the device C has a stationary member 104 to which the housing 2 is attached such that the member 104 resists forces applied in either direction to the housing 2. The housing 2 at its flange 20 may be secured to the stationary member 104 with cap screws 106 which engage the threaded holes 30 in the flange 20. The housing 2 may alternatively be secured to the rigid member 104 with clamps. The stationary member 104 remains essentially in a fixed position despite forces applied at the members 100 and 102.

The device C has the capacity to apply an axially directed force F to the push member 100, and that force will be resisted by an equal and opposite force exerted at the member 104 and transferred through the cap screws 106. In addition, the device C has the capacity to apply an axially directed force F to the push member 102 at the opposite end of the hub 4, and that force F will likewise be resisted by an equal and opposite force F exerted by the member 104. The forces F are transferred between the hub 2 and housing 4 by the rollers 8 and as the forces F are applied, the device C rotates the hub 4 to insure that the rollers 8 seat properly along the raceways 16 and 42 and the raceways 18 and 66.

Finally, the gauging device C has three displacement probes 110, preferably in the form of LVDTs (linear variable displacement transducers), which monitor the position of the push member 102 and hence the displacement of the hub 4 under the forces F, relative to the housing 2 which is secured to the rigid member 104. A single probe 110 along the axis X would also suffice. However, a preferred arrangement is three or more probes equidistant from the axis X and at equal circumferential intervals. For example, the three probes 110 may be located at 120° intervals around the axis X. Unlike the deflection at a single probe on the axis X, the deflection which results from computing the average of multiple probes is essentially free of synchronous runout of the member 102. This greatly enhances the signal to noise ratio of the measured deflection, thereby reducing the amount and duration of measurement which is required to precisely establish the mean value of the deflection. The probes 110 are oriented to measure axial displacement of the push member 102, that is, in each direction along the axis X.

To ascertain the deflection characteristics of the master bearing assembly B, the assembly B, when fitted with a selected spacer 90, is installed in the gauging device C where its hub 4 is rotated slowly. A known force F is exerted on the push member 100. It transfers through the inboard row of rollers 8 to the stationary member 104 which resists it. The force F deflects the stationary housing 2 and the rotating hub 4. The probes 110 measure the magnitude of the deflection. Indeed, known forces F of varying magnitude are applied to the member 100 and for each the deflection 102 measured at the probes 110 is recorded. The same holds true for the opposite direction. More known forces F of varying magnitude are exerted on the push member 102, which transfer through the outboard row of rollers 8 and are resisted at the member 104. For each known force F applied to the push member 102, the deflection measured by the probes 110 is recorded. Actually, each deflection measured by the probes 110 represents an average of the deflections measured by the several individual probes 110.

Figure 4A:
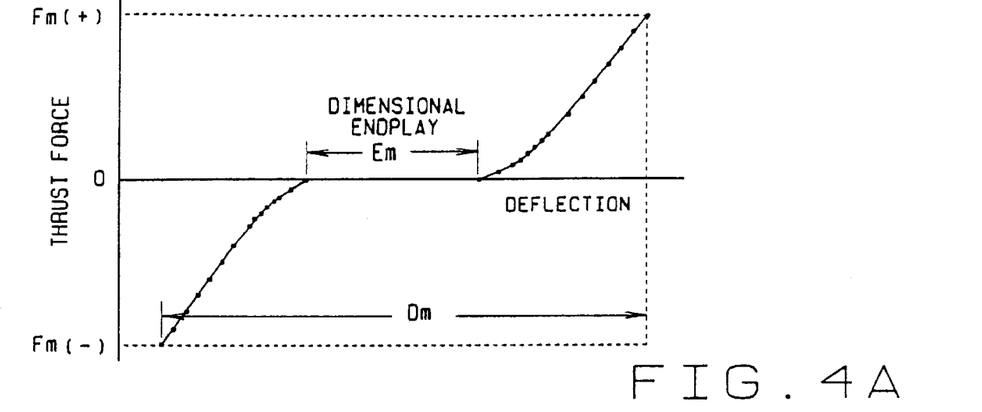

While the probes 110 measure deflection, in a more accurate sense they measure the axial position of the hub 4 with regard to a fixed reference point on the housing 2. Those positions are plotted on Cartesian coordinates against the forces that produced them, thus providing a graph (FIG. 4A) on which the load in one direction is considered positive and the load in the other direction is considered negative. For each row of rollers 8 the loads range between about 10% and 110% of the thrust capacity of that particular row. Below 10% of capacity, the rollers 8 may not seat well on the raceways 16, 42 or 18, 66 along which they roll and meaningful deflections cannot be ascertained. Between about 30% and 110% the deflection varies approximately linearly with respect to the load, so the plot forms an approximate straight line. But below 30% the plot assumes some curvature. Using the curvature between 10% and 30%, the plot for each direction of loading is extrapolated to zero load. One procedure for extrapolating the deflection to no load utilizes the least squares fit to an equation of the form:

$$\text{Deflection} = (A)(\text{thrust force})^{2/3} + B,$$

where A and B are curve-fit constants determined by the least squares algorithm. The form of the equation comes from well-known Hertzian contact theory. The extrapolation identifies a zero intercept for the plots of the forces F in the one direction and a zero intercept for the plots of the forces F in the other direction. The distance represented by the space between the two intercepts is the end play in the master bearing assembly B. In this regard, it must be recognized that the master bearing assembly B was at least initially set to a condition of end play and absolute end play may be measured with more precision than absolute preload.

Figure 4B:
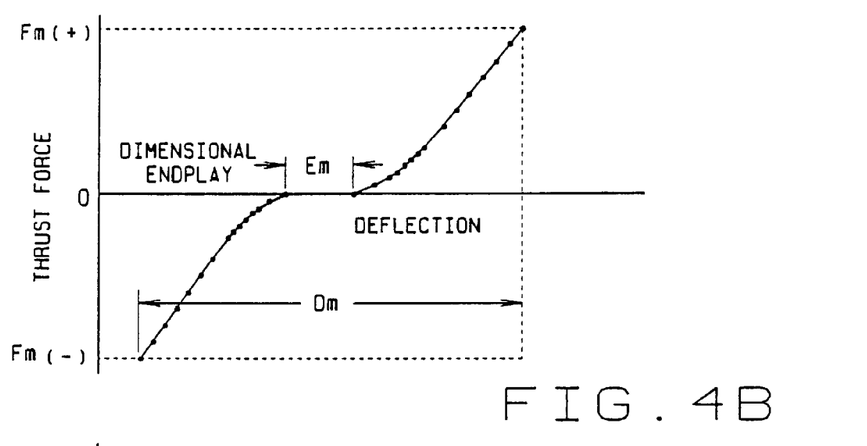
Figure 5:
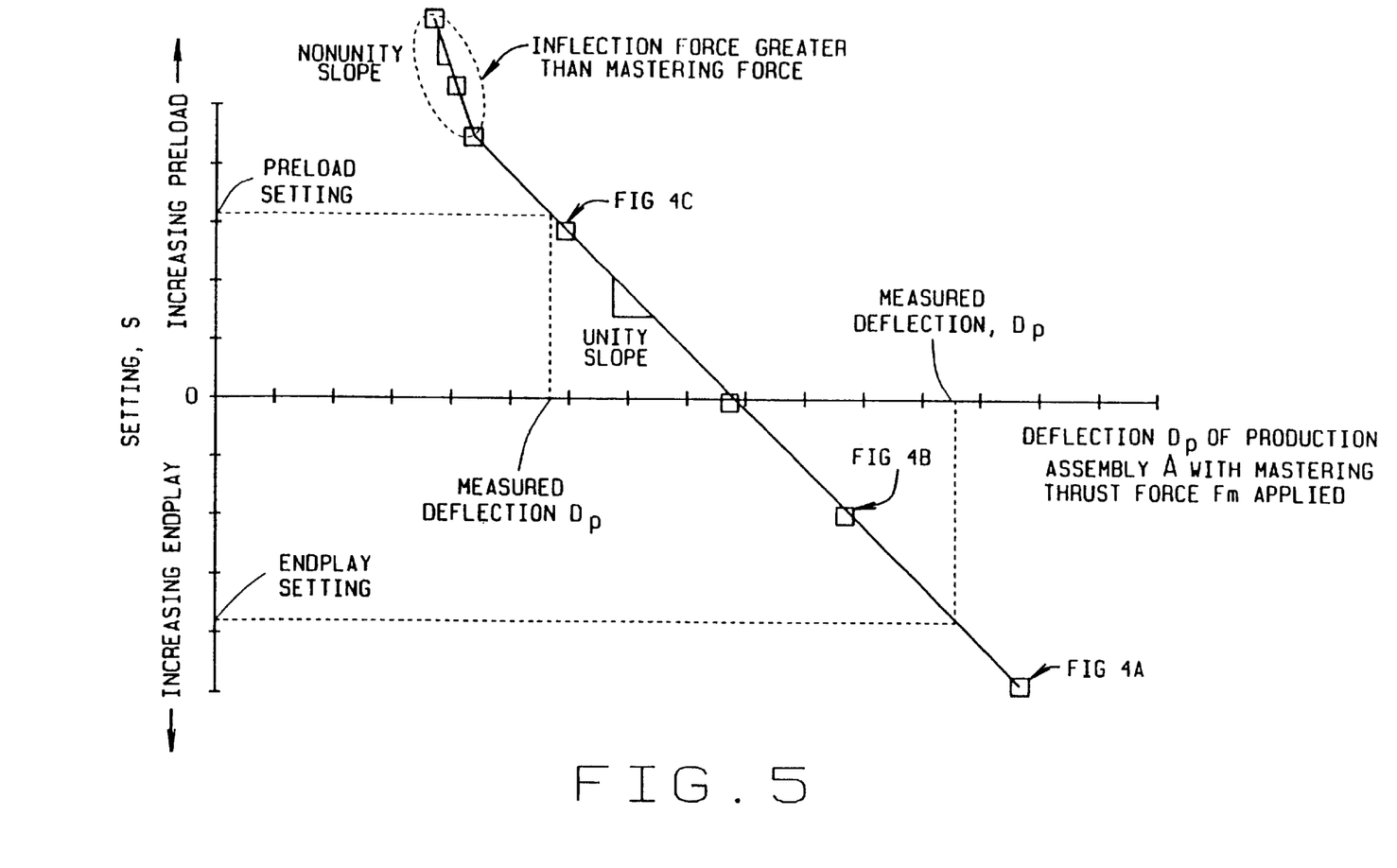
FIG. 5 is a graph showing the one-to-one relationship between bearing setting and deflection produced by a mastering thrust force.

Theoretically, only one plot that shows end play in the master assembly B is required to verify the preload in the production bearing assembly A, but several plots are produced each with a different width spacer 90 (FIGS. 4A, B, exemplify two plots). This verifies the plot that is actually used and further confirms a one-to-one relationship between bearing setting and deflection (FIG. 5). All plots should have the same slope and curvature, although the spacing between the lines produced by the two directions of thrust forces F should be at different intervals along the deflection axis to reflect the varying end play produced by the different spacers 90.

Figure 4C:
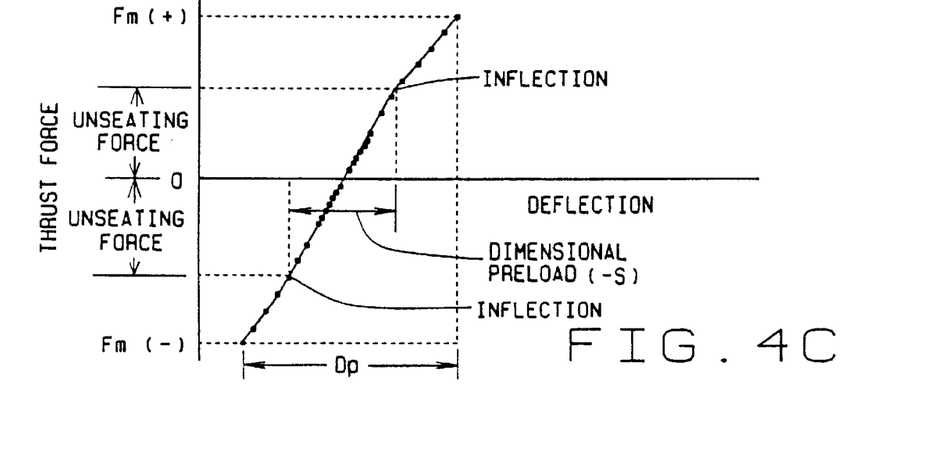

One of the spacers 90 imparts preload to the master bearing assembly B. Another plot (FIG. 4C) is made with the master bearing assembly B in the preloaded condition. The largest forces F applied in each direction are enough to unseat the rollers 8 of the row which does not transfer the thrust force F. For example, a force directed through the outboard row of rollers 8 will seat those rollers 8 firmly against the raceways 16 and 42, and the higher forces F applied in that direction, while being below 110% of the thrust capacity of the bearing assemblies, should unseat the rollers 8 of the inboard row from the raceways 18 and 66. The plot of force against deflection assumes a different slope at the higher forces F which unseat the rollers 8 of the unloaded row. The location of the change of slope is referred to as the inflection point. The plot should have two inflection points—one for each direction of thrust loading. Additional inflection points may arise with additional rows of bearings.

By comparing the deflection of the production bearing assembly A at a selected force Fm exerted in both axial directions with the deflection of the master bearing assembly B at the same selected force Fm, called a mastering force, again exerted in both axial directions, one can ascertain the magnitude of the dimensional preload in the bearing assembly A. However, the selected force Fm must be of a magnitude great enough to unseat the unloaded rollers in the production assembly A. The following formula applies:

$$S = Em + Dp - Dm$$

where

S is the dimensional setting;

Em is the end play in the master bearing assembly B;

Dp is the elastic deflection in the production bearing assembly A at the selected mastering force Fm; and Dm is the elastic deflection in the master bearing assembly B at the same selected force Fm.

The setting S appears as a negative number for preload. In the master bearing assembly B the deflection Dm includes the elastic deflection of the bearing assembly B as well as the displacement required to take up the end play Em. In the preloaded production assembly A the deflection Dp is entirely elastic.

The gauging device C produces the forces F and the deflections which create the plots. One of those forces is the mastering thrust force Fm, and it is great enough to unseat the rollers 8 of the inboard row when the force Fm is transferred through the rollers 8 of the outboard row, and to unseat the rollers 8 of the outboard row when the force Fm is transferred in the opposite direction through the rollers 8 of the inboard row. The deflection Dm at thrust force Fm is recorded.

Figure 4D:
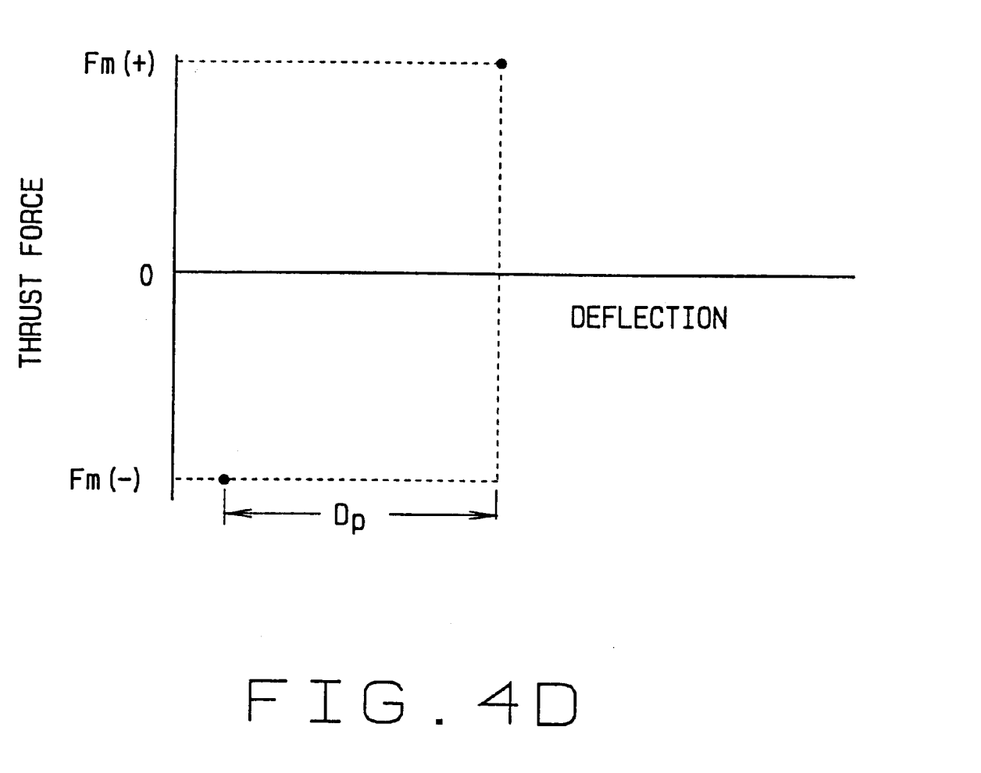

To verify the preload in the production bearing assembly A, the bearing assembly A is installed in the gauging device C and its hub 4 is rotated at the same constant speed as was the hub 4 of the master bearing assembly B. With its hub 4 rotating, the production bearing assembly A is loaded in the axial direction which transfers the thrust force F through the outboard row of rollers 8 and the raceways 16 and 42 against which they bear. The thrust force F equals the mastering thrust force Fm applied to the master bearing assembly B and must be great enough to unseat the rollers 8 of the inboard row from their raceways 18 and 60. This force is designated Fm(+). The position registered by the probes 110 is recorded. Then the thrust force F is applied in the opposite direction, that is the direction which transfers the force through the rollers 8 of the inboard row and the raceways 18 and 66 against which they bear. This force is designated Fm(−). The force Fm(−) equals the force Fm(+) previously applied in the opposite direction and is great enough to unseat the rollers 8 of the outboard row. The position registered by the probes 110 is again recorded. The dimensional difference between the two positions represents the deflection Dp in the bearing assembly A. (See FIG. 4D). The end play Em and the deflection Dm, both of which are derived from the plot produced from the master bearing assembly B, are then applied to the formula along with the deflection Dp for the production bearing assembly.

By way of example, the master bearing assembly B may have an end play Em of 0.005 inches, and when subject to the mastering thrust force Fm in both axial directions exhibits a deflection Dm of 0.030 inches. If the production bearing assembly A, which is in preload, exhibits a deflection Dp of 0.020 inches when subjected to a force F equal to the mastering force Fm in both axial directions, the preload in the production bearing A is 0.005 inches:

$$S=Em+Dp-Dm$$

$$S=0.005+0.020-0.030$$

$$S-0.005$$

In order to obtain reliable results, one must adhere to four guiding principles, namely:
1. The thrust forces Fm applied to the master bearing assembly B and the thrust forces Fm(+), applied to the production bearing assembly A in one axial direction, and Fm(−), applied to the production bearing assembly A in the opposite axial direction, must all be the same and exceed the force corresponding to the inflection point for the bearing assembly A; and
2. The bearing assemblies A and B must be rotated at a constant and equal speed; and
3. The measurements of the deflections Dm and Dp must be taken over the same number of revolutions and in the same way; including number of readings per revolution; and
4. The bearing assemblies A and B must be of essentially the same design, so as to have the same deflection characteristics in the elastic range.

When the preload in the production bearing assemblies A is plotted against the measured deflections Dp in such assemblies, a 1:1 or unity slope exists in the plot on the graph. (FIG. 5). This unity slope likewise exists for production bearing assemblies A—and of course master bearing assemblies B—set with end play. The dashed lines in the graph represent one production assembly A set in preload and another set in end play.

The formula for calculating the preload in the production bearing assembly A from a mastering force Fm and deflection derived from the master bearing assembly B of equivalent stiffness set with end play relies on several premises. First, decreasing the width of the spacer 90 in the master assembly B decreases the end play in the assembly B by exactly the same amount as the reduction in the width of the spacer 90. Secondly, a one-to-one relationship exists between bearing setting and elastic deflection for any given mastering force Fm that exceeds the inflection points (FIG. 5). Third, by using a deflection measured in the master assembly B set to an end play, which can be determined by the extrapolation procedure previously described, one can calculate any other end play setting on the same assembly B by applying the formula:

$$S=Em+Dp-Dm$$

Fourth, the same formula applies for measuring deflection in a preloaded bearing assembly B or in an equivalent production bearing assembly A, as long as the mastering force Fm which is likewise applied to the production assembly A, is great enough to unseat the rollers 8 of the unloaded row. Fifth, the deflection response between multiple production assemblies A is sufficiently uniform that the relationship between the master assembly B and any production assembly A applies to multiple production assemblies A.

The procedure, while described in connection with the bearing assemblies A and B having tapered rollers 8, is useful for verifying preload in other types of double row bearing assemblies having rolling elements of different configurations. For example, it may be used with bearing assemblies that employ angular contact ball bearings or bearing assemblies that utilize spherical rollers. Angular contact ball bearings react very similar to tapered roller bearings, and the formula employed for extrapolating the zero intercepts for the master bearing assembly B and the formula applied for calculating the preload in he production bearing assembly A are the same.

Some bearing assemblies have their rolling elements arranged in more than two rows. Typical of these bearing assemblies are those used to support machine tool spindles. For example, a spindle bearing assembly may have two rows of rolling elements located along raceways oriented to take thrust loads in one direction and another two rows located along raceways oriented to take thrust loads in the opposite direction. The procedure for ascertaining the preload in such bearing assemblies is basically the same as for a two row bearing assembly. The same formula determines the zero intercepts for the master bearing assembly, and the same formula determines the preload in the production bearing assembly. To be sure, the plots of force against deflection for the production assembly may produce an inflection point for each of the multiple rows through which the mastering force Fm is applied, so in this instance it is important to have the mastering force Fm exceed the force associated with the most remote inflection point.

What is claimed is:
1. A method of ascertaining preload in a first bearing assembly that accommodates rotation about an axis and has at least two rows of rolling elements organized such that the bearing assembly will transfer thrust loads in both axial directions, said method comprising: applying a single thrust force to the first bearing assembly such that the force is transferred through the assembly in one axial direction, with the force being at a magnitude sufficient to unseat the rolling elements of one of the rows; applying a single thrust force to the first bearing assembly such that the force is transferred through the bearing assembly in the other axial direction, with that force being of a magnitude sufficient to unseat the rolling elements of the other row; measuring the deflection that the first bearing assembly undergoes as a consequence of the thrust forces transferred through it; and comparing the deflection of the first bearing assembly with a known deflection of a second bearing assembly of equivalent stiffness under equivalent thrust forces transferred through the second bearing assembly in both axial directions while the second bearing assembly is set to a condition of known end play.

2. A method according to claim 1 wherein the deflections are compared according to the following formula:

$$S=Em+Dp-Dm$$

where:
S is the preload to be ascertained;
Em is the end play of the second bearing assembly;
Dp is the deflection produced by the thrust forces in the first bearing assembly; and
Dm is the deflection produced by the known thrust forces in the second bearing assembly.

3. The method according to claim 2 wherein thrust forces applied to the first bearing assembly are the same in both axial directions.

4. A method according to claim 1 wherein the first and second bearing assemblies each have inner and outer components between which the rolling elements of those bearing assemblies are located; and wherein for each bearing assembly one of the components rotates relative to the other component when the forces are transferred through that bearing assembly and the deflection produced by such forces is measured.

5. A method according to claim 4 wherein the deflection for each bearing assembly is measured at multiple locations around the axis for the bearing assembly.

6. A method according to claim 1 wherein the known end play in the second bearing assembly is determined by plotting deflections against thrust forces when multiple thrust loads are transferred through the rolling elements organized to transfer thrust load in one direction; by plotting deflections against thrust forces when multiple thrust forces are transferred through the rolling elements organized to transfer thrust loads in the opposite direction; extrapolating to ascertain the deflections when no thrust forces are present; and determining the dimensional difference between the extrapolated deflections representing zero thrust force.

7. A method according to claim 6 wherein the extrapolation utilizes the least squares fit.

8. A method of ascertaining dimensional preload in a production bearing assembly having an outer component, an inner component, and rolling elements arranged in first and second rows between raceways of the two components, with the rolling elements and raceways for the first row being configured to transfer thrust forces between the inner and outer components in one axial direction and the rolling elements and raceways for the second row being configured to transfer thrust forces between the inner and outer components in the other axial direction, said method comprising: transferring a thrust force between the two components through the rolling elements of the first row, with the force being of a magnitude sufficient to unseat the rolling elements of the second row; transferring a thrust force between the two components through the rolling elements of the second row, with the force being of a magnitude sufficient to unseat the rolling elements of the first row; measuring the deflection of the first component relative to the second component as a consequence the transfer of the thrust forces through both rows of rolling elements; and comparing the deflection in the production bearing assembly with the deflection in a master bearing assembly of similar configuration and stiffness, but having been set to a condition of known end play, with the deflections being compared at an equivalent thrust force transferred through the first row of rolling elements and another equivalent thrust force transferred through the second row of rolling elements in the master bearing assembly.

9. A method according to claim 8 wherein the deflections of the production and master bearing assemblies are compared according to the following formula:

$$S=Em+Dp-Dm$$

where:
S is the preload in the production bearing assembly;
Em is the end play in the master bearing assembly;
Dp is the deflection of the production bearing assembly; and
Dm is the deflection of the master bearing assembly.

10. A method according to claim 8 wherein the thrust force applied to the production bearing assembly in the direction which transfers those forces through the first row of rolling elements is the same as the thrust force applied to the production bearing in the direction which transfers the thrust force through the second row of rolling elements.

11. A method according to claim 8 wherein the thrust force which is transferred through the first row of rolling elements in the production assembly is great enough to unseat the rolling elements of the second row from their raceways, and the thrust force which is transferred through the second row of rolling elements in the production assembly is great enough to unseat the rolling elements of the first row from their raceways.

12. A method according to claim 11 wherein the end play in the master bearing assembly is determined by comparing deflections with thrust forces when the thrust loads are transferred through the first rolling elements; by comparing deflections with thrust forces when multiple thrust forces are transferred through the second row of rolling elements; extrapolating to ascertain the deflections when no thrust forces are present; and determining the dimensional difference between the extrapolated deflections representing zero thrust force.

13. A method according to claim 12 wherein the extrapolating utilizes the least squares fit.

14. A method according to claim 8 wherein for each bearing assembly one of the components is rotated relative to the other component about the axis when the thrust forces are transferred through the bearing assembly and the deflection produced is measured.

15. A method according to claim 14 wherein the deflections for each bearing assembly are measured at multiple locations around the axis for that bearing assembly.

16. A method according to claim 8 wherein the inner component of the production bearing assembly is unitary; wherein the inner component for the master bearing assembly is segmented with the first row of rolling elements for the master bearing assembly being on one segment and the second row being on the another segment.

17. A method according to claim 16 wherein the master bearing assembly includes a spacer that is located between its segments and establishes the known end play of the master bearing assembly.

18. A method according to claim 17 wherein the master bearing assembly is essentially the same as the production bearing assembly, except for the segmented inner component and the spacer.

19. A method of ascertaining dimensional preload in a production bearing assembly having an outer component, an inner component, and rolling elements arranged in first and second rows between raceways on the inner and outer components, with the rolling elements and raceways for the first row being configured to transfer thrust forces between the inner and outer components in one axial direction and the rolling elements and raceways of the second row being configured to transfer thrust forces between the inner and outer components in the other axial direction, said method comprising: establishing the deflection characteristics of a master bearing that is similar in configuration to the production bearing assembly and has substantially the same stiffness, but differs in that it is set to a condition of end play; from the deflection characteristics of the master bearing, calculating the end play (Em) in the master bearing assembly; transferring a first thrust force between the inner and outer components of the master assembly through the rolling elements of the first row; transferring a second thrust force between the inner and outer components of the master assembly through the rolling elements of the second row; calculating the deflection (Dm) in the master bearing assembly produced by the first and second thrust forces; transferring a third thrust force equal to the first thrust force between the inner and outer components of the production assembly through the rolling elements of the first row for the production assembly, transferring a fourth thrust force equal to the second thrust force between the inner and outer components of the production assembly through the rolling elements of the second row for the production assembly; measuring the deflection Dp produced in the production assembly by the third and fourth thrust forces transferred through its rolling elements; and calculating the preload in the production bearing assembly according to the following formula:

$$preload = Em + Dp - Dm.$$

20. The method according to claim 19 wherein the first thrust force is of a magnitude sufficient to unseat the rolling elements in the second row of the master bearing assembly from their raceways and the second thrust force is of a magnitude sufficient to unseat the rolling elements in the first row of the master bearing assembly from their raceways.

21. The method of claim 20 wherein the deflection characteristics of the master bearing assembly are determined by transferring forces of varying magnitudes between the inner and outer components of the master bearing assembly, with the forces passing through the rolling elements of the first and second rows, and the end play is calculated by extrapolating deflections at low forces to zero force.

22. The method according to claim 21 wherein the deflection characteristics of the master bearing assembly are determined by plotting forces transferred against the deflections caused by such forces.

23. The method according to claim 21 wherein the first and second thrust forces are equal.

24. A method according to claim 19 wherein the inner component of the master bearing assembly is segmented into two segments with the rolling elements of the first row being around the one of the segments and the rolling elements of the second row being around the second element; and wherein the master bearing assembly also includes a spacer located between the segments to establish the end play in the master bearing assembly.

25. A method of ascertaining preload in a first bearing assembly that accommodates rotation about an axis and has at least two rows of rolling elements organized such that the bearing assembly will transfer thrust loads in both axial directions, said method comprising: applying a thrust force to the first bearing assembly such that the force is transferred through the assembly in one axial direction; applying a thrust force to the first bearing assembly such that the force is transferred through the bearing assembly in the other axial direction; measuring the deflection that the first bearing assembly undergoes as a consequence of the thrust forces transferred through it; and comparing the deflection of the first bearing assembly with a known deflection of a second bearing assembly under known thrust forces transferred through the second bearing assembly in both axial directions while the second bearing assembly is set to a condition of known end play, with the deflections being compared according to the following formula:

$$S = Em + Dp - Dm$$

where:
S is the preload to be ascertained;
Em is the end play of the second bearing assembly;
Dp is the deflection produced by the thrust forces in the first bearing assembly; and
Dm is the deflection produced by the known thrust forces in the second bearing assembly.

26. A method of ascertaining preload in a first bearing assembly that accommodates rotation about an axis and has at least two rows of rolling elements organized such that the bearing assembly will transfer thrust loads in both axial directions, said method comprising: applying a thrust force to the first bearing assembly such that the force is transferred through the assembly in one axial direction; applying a thrust force to the first bearing assembly such that the force is transferred through the bearing assembly in the other axial direction, the forces in both axial directions being the same, the force applied in either direction being transferred through one of the rows of rolling elements and being of a magnitude sufficient to unseat the rolling elements at the other row of rolling elements; measuring the deflection that the first bearing assembly undergoes as a consequence of the thrust forces transferred through it; and comparing the deflection of the first bearing assembly with a known deflection of a second bearing assembly under thrust forces that are the same as the thrust forces transferred through the first bearing assembly and are transferred through the second bearing assembly in both axial directions while the second bearing assembly is set to a condition of known end play.

27. A method of ascertaining preload in a first bearing assembly that accommodates rotation about an axis and has a unitary inner component, an outer component and at least two rows of rolling elements organized between the inner and outer components such that the bearing assembly will transfer thrust loads in both axial directions, said method comprising: applying a thrust force to the first bearing assembly such that the force is transferred through the assembly in one axial direction; applying a thrust force to the first bearing assembly such that the force is transferred through the bearing assembly in the other axial direction; measuring the deflection that the first bearing assembly undergoes as a consequence of the thrust forces transferred through it; and comparing the deflection of the first bearing assembly with a known deflection of a second bearing assembly under known thrust forces transferred through the second bearing assembly in both axial directions while the second bearing assembly is set to a condition of known end play, the second bearing assembly being essentially identical in configuration and stiffness to the first bearing assembly with the exception that its inner component is segmented such that one of the rows of rolling elements for the second bearing assembly is around one segment and the other row of rolling elements is around the other segment.

28. A method of ascertaining dimensional preload in a production bearing assembly having an outer component, an inner component, and rolling elements arranged in first and second rows between raceways of the two components, with the rolling elements and raceways for the first row being configured to transfer thrust forces between the inner and outer components in one axial direction and the rolling elements and raceways for the second row being configured to transfer thrust forces between the inner and outer components in the other axial direction, said method comprising: transferring a thrust force between the two components through the rolling elements of the first row; transferring a thrust force between the two components through the rolling elements of the second row; measuring the deflection of the first component relative to the second component as a consequence the transfer of the thrust forces through both rows of rolling elements; and comparing the deflection in the production bearing assembly with the deflection in a master bearing assembly of similar configuration and stiffness, but having been set to a condition of known end play, with the deflection of the master bearing assembly having been produced by thrust a force transferred through the first row of rolling elements and another thrust force transferred through the second row of rolling elements in the master bearing assembly, the deflections of the production and master bearing assemblies being compared according to the following formula:

$$S = Em + Dp - Dm$$

where:
S is the preload in the production bearing assembly;
Em is the end play in the master bearing assembly;
Dp is the deflection of the production bearing assembly; and
Dm is the deflection of the master bearing assembly.

29. The method according to claim 26 wherein the deflections are compared according to the following formula:

$$S = Em + Dp - Dm$$

where:
S is the preload to be ascertained;
Em is the end play of the second bearing assembly;
Dp is the deflection produced by the thrust forces in the first bearing assembly; and
Dm is the deflection produced by the known thrust forces in the second bearing assembly.

30. The method according to claim 28 wherein the thrust forces applied to the production bearing assembly and the thrust forces that were applied to the master bearing assembly are equal.

* * * * *